Patented Feb. 4, 1930

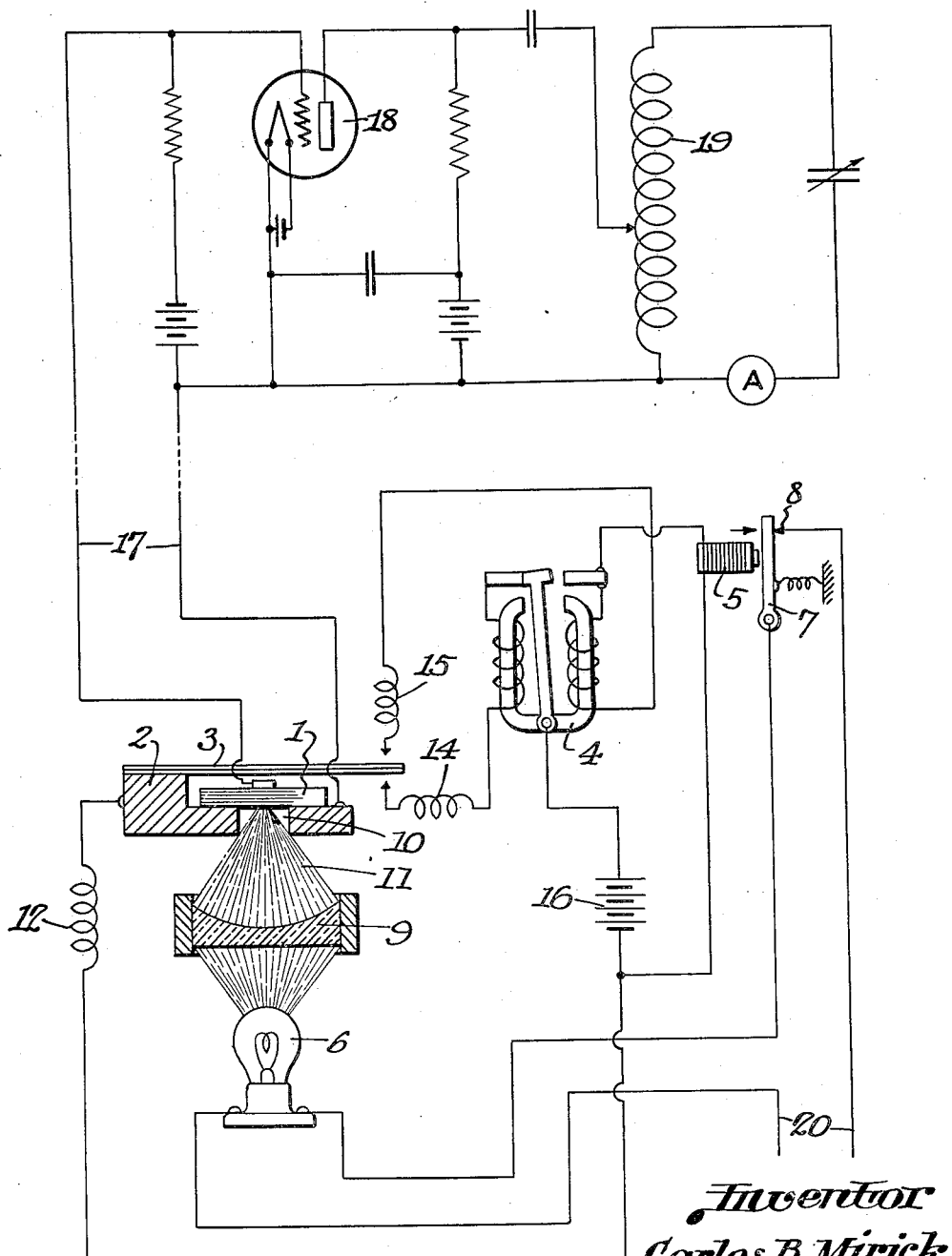

1,746,125

UNITED STATES PATENT OFFICE

CARLOS B. MIRICK, OF WASHINGTON, DISTRICT OF COLUMBIA, ASSIGNOR TO NATIONAL ELECTRICAL SUPPLY COMPANY, OF WASHINGTON, DISTRICT OF COLUMBIA, A CORPORATION OF VIRGINIA

TEMPERATURE-REGULATION SYSTEM FOR FREQUENCY CONTROL OR STABILIZING APPARATUS

Application filed March 9, 1929. Serial No. 345,877.

My invention relates broadly to frequency control systems and more particularly to a method of controlling the temperature of a frequency control or stabilizing device.

One of the objects of my invention is to provide a system of temperature regulation for frequency control or stabilizing systems wherein the capacity effects of the temperature regulating apparatus upon the frequency control or stabilizing devices are substantially negligible.

Another object of my invention is to provide a system for controlling the temperature of a frequency control or stabilizing device wherein a change in temperature of the frequency control or stabilizing device is prevented by the focusing of heat rays upon the frequency control or stabilizing device from a distance, the source of heat rays becoming effective or ineffective in accordance with variations in temperature of the frequency control or stabilizing device.

Still another object of my invention is to provide a relay system for controlling the supply of heat rays from a source of heat and the direction and concentration of such heat rays upon the frequency control or stabilizing devices in such manner that the temperature of the frequency control or stabilizing device is maintained substantially constant.

Other and further objects of my invention reside in a system of temperature regulation for frequency control or stabilizing devices where capacity effects of the temperature regulating apparatus are substantially negligible by virtue of the character of heat energy concentrated upon the frequency control or stabilizing device, as set forth more particularly in the specification hereinafter following and shown in the accompanying drawing which diagrammatically illustrates the principles of my invention as applied to a piezo electric crystal control system for high frequency oscillators.

While I have shown my invention as applied to a piezo electric crystal control system it is to be understood that the invention may be employed in association with other types of frequency control or stabilizing devices such as magneto-striction systems. The embodiment of my invention therefore as applied to piezo electric crystal oscillators is to be considered in an illustrative rather than in any limiting sense.

Frequency control apparatus for high frequency oscillators used in signal transmitters must be maintained at constant temperature if accuracy of frequency control is to be obtained. Heretofore in an effort to secure efficient temperature control it has been proposed to introduce a heating unit in close proximity to the crystal, which heating unit inherently possesses relatively large capacity to ground thereby introducing into the frequency control system inaccuracies due to the additional capacity between the frequency control device and ground.

My invention makes use of a remote source of heat rays concentrated upon the frequency control device for supplying heat without introducing electrostatic capacity to ground. In the system of my invention I provide a source of heat rays as derived from an incandescent lamp, the rays being concentrated by an optical system upon the frequency control or piezo electric device. The heat source is rendered effective or ineffective by the actuation of a thermostatic switch which controls a primary relay circuit, which in turn operates a secondary relay circuit rendering the system accurate in its regulation of frequency.

Referring to the drawing, reference character 1 represents a piezo electric crystal holder and 2 a portion of the receptacle in which the holder is supported. The piezo electric cystal is mounted within the holder in any desired manner as shown for example, in my Patents 1,683,091 and 1,683,092, dated September 4, 1928, or as disclosed in my joint Patent 1,683,093 with Alfred Crossley, dated September 4, 1928. A thermostat strip 3 is attached to receptacle 2 and consists of a suitable bimetallic element, capable of movement under conditions of temperature variation, and the construction is such that 1 and 2 and 3 are in close articulation and consequently are all at about the same temperature. Battery 16 is connected to strip 3 and by action of the strip operates neutral relay 4, which in turn operates secondary relay 5. The source of heat is lamp 6 which is turned on or off by the movement of armature 7 with respect to contact 8 of relay 5. This lamp is placed at a suitable distance from 1 to make the electrostatic capacity between them negligibly small. The heat radiation from the lamp is focused through lens system 9 to fall directly on holder 1 as represented at 11, part of which is exposed by a window or aperture 10 in support 2. It is to be understood that the lamp 6 may be of any convenient type though an incandescent lamp is indicated in the drawing. It is to be further noted that the exposed surface of the crystal holder 1 is blackened to facilitate absorption of heat from the rays 11. The control wires connected to 2 and 3 are povided with choke coils 12, 14 and 15 so that the crystal holder 1 and receptacle 2 may be maintained at a high radio potential which is prevented from passing into the relay system.

The terminals of the frequency control or stabilizing device connect to the input of an oscillator system through conductors 17 extending to the grid and filament electrodes of electron tube 18, which is connected in the oscillatory circuit 19. By maintaining the temperature of the frequency control or stabilizing device constant the oscillator is maintained in operation at a constant frequency.

In the event that the temperature of the frequency control device should rise above a predetermined point thermostatic switch 3 operates primary relay 4, which in turn controls secondary relay 5 to open the circuit from the power source connected to leads 20 and extinguish the light source 6. When the temperature of the frequency control or stabilizing device falls below a predetermined point primary relay 4 is actuated to control secondary relay 5 to cut on the source of light rays thereby raising the temperature of the frequency control or stabilizing device and maintaining such temperature at the required point. It will be observed that the source of heat is of such character as not to introduce capacity effects into the oscillator system and thus impair the accuracy of frequency control of the oscillator.

The source of heat rays may be remotely positioned with respect to the frequency control or stabilizing device and the heat rays concentrated by means of the optical system and focused upon the temperature control or stabilizing device to maintain the temperature thereof uniform.

While I have described my invention in one of its preferred embodiments I desire that it be understood that modifications may be made and that no limitations upon my invention are intended other than those imposed by the scope of the appended claims.

What I claim as new and desire to secure by Letters Patent of the United States is as follows:

1. In a temperature regulation system for frequency control or stabilizing devices, means for mounting a frequency control or stabilizing device, optical means for directing heat rays upon said frequency control or stabilizing device, and means for controlling the supply of heat rays through said optical means in accordance with variations in temperature of said frequency control or stabilizing device.

2. In a temperature regulation system for frequency control or stabilizing devices, means for mounting a frequency control or stabilizing device, a source of heat rays remotely positioned with respect to said means, means for focusing said heat rays upon said device, and means controllable by variation in temperature at said mounting for rendering said source of heat rays effective or ineffective for maintaining said frequency control or stabilizing device at constant temperature.

3. In a temperature regulation system for frequency control or stabilizing devices, means for mounting a frequency control or stabilizing device, a thermostatic switch carried by said means, contacts cooperatively related to said switch, a relay circuit controllable by the position of said switch with respect to said contacts, a source of heat rays remotely positioned with respect to said means, an optical system for focusing said heat rays upon said frequency controlling or stabilizing device, and means controlled by said relay circuit for rendering said source of said heat rays effective or ineffective for maintaining said frequency control or stabilizing device at constant temperature.

4. In a temperature regulation system for frequency control or stabilizing devices, a mounting carrying a frequency control or stabilizing device, a source of heat rays remotely positioned with respect to said mounting, means for focusing said heat rays in a beam upon said frequency control or stabilizing device, and means controlled by the temperature at said mounting for cutting on or off the heat rays and correspondingly controlling the temperature of said frequency control or stabilizing device.

5. In a system for regulating the temperature of a frequency control or stabilizing device, a support, a frequency control or stabilizing device carried by said support, a thermostatic switch mounted adjacent said device, a source of heat rays positioned in alignment with said support, means for focusing said heat rays upon the frequency control or stabilizing device mounted on said support, and circuits controlled by the movement of said thermostatic switch for rendering effective or ineffective said source of heat.

rays for maintaining said frequency control or stabilizing device at uniform temperature.

6. In a system for regulating temperature in a frequency control or stabilizing device, a supporting member, a frequency control or stabilizing device carried by said supporting member, a source of heat rays located in alignment with said supporting member but remote therefrom, means for concentrating said heat rays in a beam upon said frequency control or stabilizing device, temperature actuated switching means positioned adjacent said device, and means controlled by the operation of said switching means for cutting on or off said source of said rays and regulating the temperature of said frequency control or stabilizing device.

7. In a system of temperature regulation for frequency control devices, a supporting member, a frequency control or stabilizing device carried by said supporting member, a source of heat energy electrostatically isolated from said device, means for concentrating said heat energy in a beam upon said device, and switching means controllable by the temperature existent at said frequency control or stabilizing device for rendering said source of heat energy effective or ineffective.

8. A temperature regulation system for frequency control or stabilizing devices comprising a mounting, a frequency control or stabilizing device carried by said mounting, a source of heat energy electrostatically isolated from said device, optical means for focusing said heat energy in a beam upon said device, relay circuits, switching means positioned adjacent said mounting and movable under conditions of temperature variation to selectively place said relay circuit in either of two conditions for correspondingly controlling the source of heat energy and regulating the temperature of said device.

CARLOS B. MIRICK.